United States Patent [19]
Rosenberry, Jr.

[11] 3,739,249
[45] June 12, 1973

[54] SPEED CONTROL CIRCUIT FOR A SINGLE PHASE ALTERNATING CURRENT MOTOR

[75] Inventor: George M. Rosenberry, Jr., Elnora, N.Y.

[73] Assignee: General Electric Company, Schenectady, N.Y.

[22] Filed: Oct. 5, 1971

[21] Appl. No.: 186,622

[52] U.S. Cl. .................................. 318/227, 318/230
[51] Int. Cl. .............................................. H02p 5/40
[58] Field of Search .......................... 318/227, 230; 321/13

[56] References Cited
UNITED STATES PATENTS
| | | | |
|---|---|---|---|
| 3,387,196 | 6/1968 | Graham et al. | 318/227 |
| 3,560,825 | 2/1971 | Elliott | 318/227 |
| 3,539,900 | 11/1970 | Chausse et al. | 321/13 UX |
| 3,654,541 | 4/1972 | Kelley et al. | 321/13 |

Primary Examiner—Gene Z. Rubinson
Attorney—Vale P. Myles, Frank L. Newhauser and Oscar B. Waddell et al.

[57] ABSTRACT

A speed control circuit for a single phase alternating current motor including controllable bidirectional current conducting means gated at a selected phase angle of each half cycle of the alternating current. A timing capacitor, which charges to a first level at a relatively fast rate and then to a higher or critical charge level at a relatively slow rate, generates an electrical pulse when it discharges at the higher level to gate the current conducting means. Although the timing capacitor discharges at the higher charge level, the phase angle of an alternating current half cycle at which it discharges depends upon the level to which it is first charged at the faster rate. This follows since the capacitor would reach the higher charge level at an earlier time in a half cycle if it charged to a higher, rather than a lower, first charge level at the faster rate. Further, after the timing capacitor discharges to gate the current conducting means, a transistor in parallel with the capacitor becomes conductive to prevent the capacitor from recharging to the higher charge level until the next following half cycle of the alternating current. This provision insures a proper timing of the circuit as well as preventing the generation of more than one gating pulse during each half cycle. Finally, since only a single gating pulse is generated each half cycle, means are provided to insure against the attempted gating of a current conducting means that does not have a voltage of proper amplitude applied across it and thereby waste the gating pulse generated for that half cycle of the alternating current.

7 Claims, 1 Drawing Figure

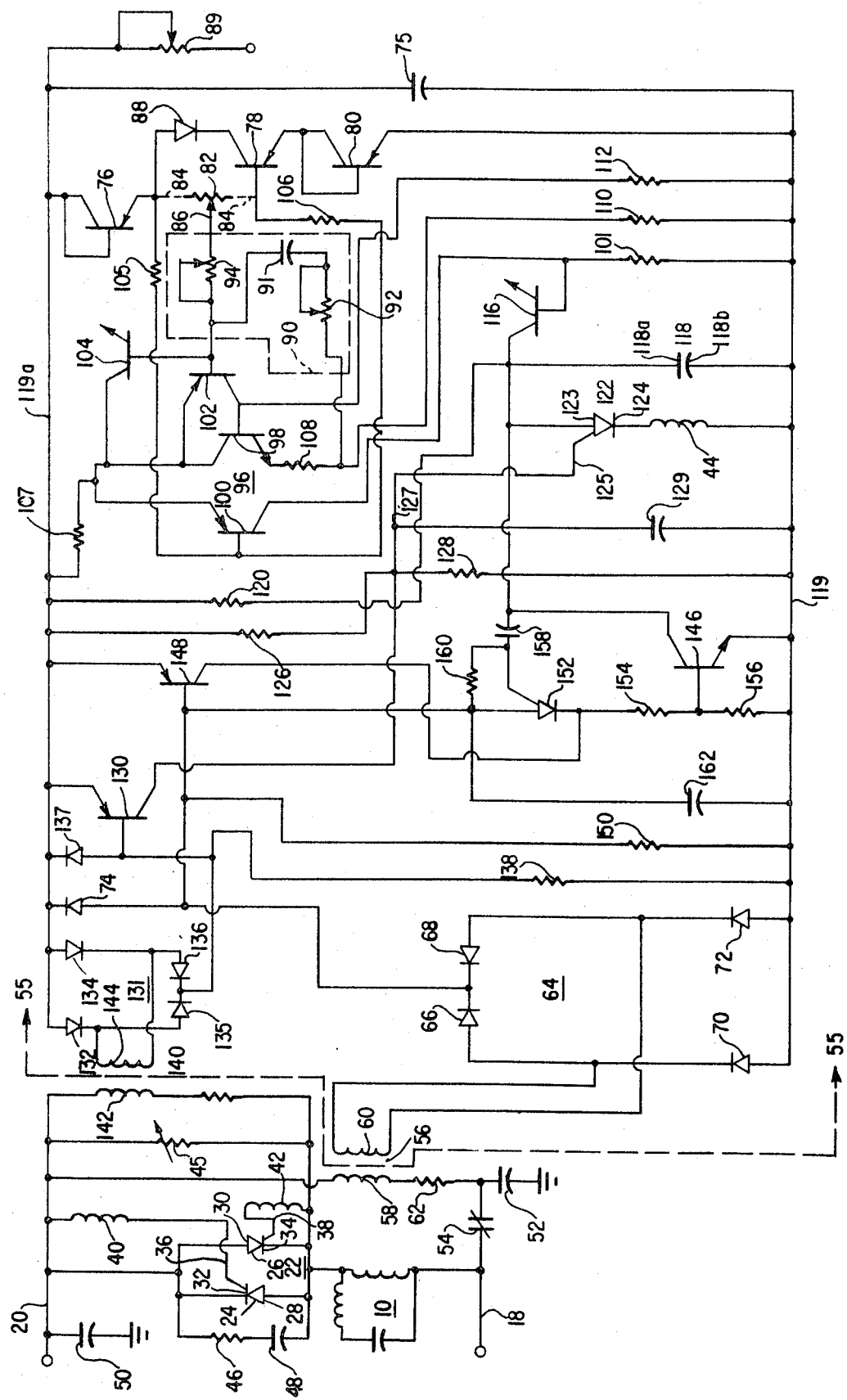

SPEED CONTROL CIRCUIT FOR A SINGLE PHASE ALTERNATING CURRENT MOTOR

BACKGROUND OF THE INVENTION

The invention relates to an improvement in a circuit for controlling the speed of an electric motor and more particularly, to a speed control for an alternating current motor.

In the prior art it has been a common practice to control the speed of an alternating current motor by periodically interrupting the current flow thereto so that power is supplied to the run windings for something less than a full cycle. A well known arrangement for accomplishing this control includes an SCR or controlled unidirectional current conducting means in series with the motor and an alternating current supply source. Timing means are provided to gate the SCR at a selected phase angle of each half cycle, thereby allowing current to be supplied to the motor for that period of time remaining in the half cycle. By employing a second SCR in parallel, but in opposite conductivity to the direction of conductivity of the first SCR, current flow during both half cycles of the alternating current signal can be controlled. It is also common practice to provide a reactive component such as a capacitor as a means for timing the firing of the SCR or SCR's, and in such prior art circuits the rate of charge and/or discharge of such components provides a reasonably acceptable means for gating the SCR at some definite phase angle during the period of an alternating current cycle.

Such circuits, however, have not been entirely trouble free and heretofore, one problem involved that of constant speed reliability. In particular, timing capacitors of the prior art circuits would on occasion discharge at an improper time of a cycle when the SCR's did not have a voltage of sufficient amplitude developed across them to respond to a gating signal. Then, later in the same half cycle when the SCR would have a voltage of sufficient amplitude developed across it to respond to the gating signal, the discharged capacitor would not be capable of charging quickly enough to be ready to discharge at that proper time. Thus, the current supply to the motor would be completely interrupted for one or more half cycles during any given period, thereby causing the speed of the motor to become erratic.

With the foregoing in mind, it is therefore an object of the present invention to provide an improved speed control for alternating current motors.

Another object of the invention is to provide a speed control which reliably supplies timing pulses to gate the SCR's or controlled bidirectional current conducting means supplying current to the motor.

A further object of the invention is to provide an improved timing circuit whereby a single timing pulse for gating the SCR's or controlled bidirectional current conducting means is assured during each half cycle.

Still another object of the subject invention is to provide means for insuring that the timing pulse for any one half cycle is not wasted on trying to gate the current conducting means when it does not have a voltage of sufficient amplitude developed across it to respond to the gating signal.

These and other objects of the subject invention will become apparent from the following detailed description including the accompanying drawings forming a part of the specification.

SUMMARY OF THE INVENTION

The present invention provides an improved means for controlling the speed of an alternating current motor by supplying gating pulses to controlled bidirectional current conducting means or SCR's controlling the current flow to the motor for a selected period of time during each half cycle of an alternating current supply voltage. At some definite but variable phase angle of each half cycle of the alternating current being provided to drive the motor, a pulse supplied from a firing and control circuit gates an SCR causing it to conduct, thereby allowing current to flow to the motor for the remaining part of that half cycle. A similar gating pulse is supplied to the appropriate SCR on the next half cycle and each subsequent half cycle to insure constant speed operation. The firing and control circuit includes a timing capacitor with means for charging the capacitor to a critical charge level at different rates to determine the phase angle of a half cycle of alternating current at which the SCR's are caused to conduct. A particular feature of this timing circuit allows the timing capacitor to be charged at a relatively fast, rate to a variable first charge level, and then allows the capacitor to continue to charge at a relatively slower, rate, i.e., to a critical or second charge level. At the critical charge level the capacitor discharges to cause the gating of one of the SCR's. In this improved circuit, the first charge level is a determinative factor in controlling at what later time in a half cycle the timing capacitor reaches its critical charge level. This follows since the timing capacitor will reach the critical charge level at an earlier time in a half cycle at the slow charge rate if it has been charged to a higher charge level initially at the fast charge rate. Thus, since the first charge level determines the firing angle of the SCR's, it also determines the speed of the motor. The invention also includes a circuit for holding the timing capacitor discharged after it fires until the start of the next half cycle, thereby insuring against the generation of more than one gating pulse during any one half cycle of operation.

Finally, an inhibit circuit is provided to insure against the attempted gating of the controllable bidirectional current conducting means or SCR's at a time when they do not have a voltage of sufficient amplitude developed across them to respond to the gating signal. This circuit includes means to sense the voltage developed across the SCR's as well as means to prevent the timing capacitor from discharging in the event the amplitude of the sensed voltage is not sufficiently high to permit conduction *if gated*. Thus, a timing pulse is not wasted on an SCR that would not conduct at the time it is gated.

BRIEF DESCRIPTION OF THE DRAWINGS

In the sole FIGURE of the drawing there is depicted a motor speed control circuit embodying the present invention.

DESCRIPTION OF THE PREFERRED EMBODIMENT

Referring now to the drawing, there is shown in schematic form the windings of a permanent split capacitor, single phase voltage motor 10, connected to a speed control circuit constructed in accordance with a preferred embodiment of the present invention. Power is supplied to the motor and circuit through leads 18 and 20 from an alternating current voltage source, (not shown). A controllable current conducting circuit, indicated generally at 22, which is connected in series with the motor 10 and the source of alternating current, comprises a pair of oppositely poled, controllable bidirectional current conducting means or devices such as SCR's 24 and 26. A single triac having the proper specifications could be substituted for the SCR's used herein for illustrative purposes. The SCR's 24 and 26 include anodes 28 and 30, cathodes 32 and 34, and gate leads 36 and 38 respectively. The gate leads 36 and 38 are connected to the secondary windings 40 and 42 respectively, of a pulse transformer, the primary whereof is schematically shown at 44. A varistor 45 is included when operating with the parallel SCR's protecting them against overvoltage conditions. When operating with a triac, no such protection component would be necessary.

An RC network consisting of a resistor 46 and a capacitor 48, having properly selected parameters as is well known in the art, is electrically connected in parallel with the SCR's. This network functions as a means to bypass any spikes on the alternating current supply line which could cause unpredictable operation of the SCR's. Capacitors 50 and 52 are included for the purpose of bypassing any radio frequency interference to ground, while a thermostat 54 provides a means for protecting the motor 10 against current overloads.

Power is introduced to a firing and control circuit 55 by transformer 56. The primary winding 58, which is in series with a current limiting resistor 62, is powered by the same alternating current source used to drive the motor 10. This alternating current is coupled from the primary winding 58 to a secondary winding 60 of the transformer 56. The voltage developed across the secondary winding 60 is fed to the input of a bridge rectifier 64 comprised of rectifying diodes 66, 68, 70, and 72. A full wave pulsed voltage taken from the output of this bridge rectifier is fed through a diode 74, to a filter capacitor 75 and a series of three transistors 76, 78, and 80 electrically connected to act as zener diodes. The three transistors 76, 78, and 80 comprise a voltage regulating circuit, developing a direct current (DC) bus voltage of approximately 24 volts across the series coupling. An additional low-valued variable resistance 82 is shown tied between the emitter of transistor 76 and the base of transistor 78. This resistance is, in fact, a pressure transducer as indicated by the dashed lines 84 denoting an external connection. A DC control voltage is developed at the wiper arm 86 of the pressure transducer, thereby sensing pressure changes in an external system (not shown) monitored. A diode 88 in series with the emitter of transistor 76 and collector of transistor 78 clamps the voltage developed across resistance 82 to some nominally low value.

The DC control voltage detected by the wiper arm 86 is fed to a feedback stabilization network 90 consisting of a capacitor 91 and a pair of potentiometers 92 and 94. From the stabilization network the control voltage is introduced to a differential amplifier 96 where it is amplified to a usable level. The differential amplifier, which includes a pair of transistors 98 and 100, compares the amplitude of the unamplified DC control voltage introduced into the base of transistor 98, with the amplitude of a relatively fixed DC reference voltage taken from across resistor 82, and introduced into the base of transistor 100 through the voltage dividing network formed from resistors 105 and 106. As the unamplified DC control voltage changes due to pressure variations in the external system, the differential amplifier 96 will cause an amplified DC control voltage to be developed across a load resistor 101 in the collector circuit of transistor 100.

The differential amplifier further includes transistor 102 which operates in conjunction with transistor 98 to form a modified darlington configuration for the purpose of increasing current gain. A transistor 104, connected as a diode, prevents an excessive voltage from developing across transistor 102. The additional components associated with the differential amplifier include an emitter resistor 107 for transistor 100, resistors 108 and 110 which serve the dual purpose of controlling the amount of feedback to the stabilization network 91, as well as serving as an emitter resistance for transistor 98, and resistor 112 which developes the bias voltage for transistor 100.

The DC control voltage developed across resistor 101 is introduced into the timing circuit through transistor 116, connected as a diode, and into one side 118a of a timing capacitor 118, the other side of which capacitor 118b is connected to a reference level bus 119 or one side of the direct current supply. A relatively large resistor 120 is connected between side of capacitor 118a and the DC bus voltage line 119a. As will be discussed in more detail when considering the circuit operation, transistor 116 provides a relatively fast charge path for capacitor 118, while resistor 120 serves as a relatively slow charge path.

The actual timing pulses for SCR's 24 and 26 are developed across primary winding 44 of the pulse transformer and induced into secondary windings 40 and 42 in series with the gate leads 36 and 38 respectively of the SCR's. Electrically associated with winding 44 is a programmable unijunction transistor (PUT) 122, having an anode 123 tied to the juncture of capacitor side 118a, diode 116, and resistor 120. PUT 122 further has a cathode 124 in series with the primary winding 44, the other side of which winding is tied to reference bus 119. A gate lead 125 from PUT 122 is connected to a juncture 127 of a filter capacitor 129 filtering the reference voltage of PUT 122 against line voltage variations, and a pair of resistors 126 and 128 forming a voltage dividing network across the direct current supply. From juncture 127 a connection is made to the collector of a transistor 130, the base of which transistor is tied to a voltage developing resistor 138, and the output of a bridge rectifier 131 comprised of diodes 132, 134, 135, and 136. An appropriately poled diode 137 is connected across the base to emitter junction of transistor 130 and serves to clamp the voltage developed across that junction to some nominally low value. To the input of the bridge rectifier is introduced an AC voltage from a transformer 140 having a primary winding 142 and a secondary winding 144. The primary winding of transformer 140 is connected across the SCR's 24 and 26, and senses for the presence of a predetermined voltage of proper amplitude thereacross. The presence or absence of the predetermined voltage results in the SCR's being operable or non-operable respectively. In an operable state the SCR's will conduct if gated, whereas in a non-operable state they will not conduct. Through the action of the bridge rectifier, resistor 138 and transistor 130, the absence or presence of the predetermined voltage results in a signal which is communicated to PUT 122 to permit or inhibit the firing thereof. Thus, the combined components serve as an inhibit circuit for the gating pulses.

To insure proper timing of the circuit, after timing capacitor 118 initially discharges to generate a gating pulse for the SCR's, the capacitor 118 is held in the discharged stage or inhibited from recharging until some time after the alternating current goes to zero. Transistor 146 is connected electrically in parallel with timing capacitor 118, and while this transistor is conducting, the timing capacitor is effectively shorted and cannot recharge. The timely conduction of transistor 146 or first switch means is assured through a circuit including a transistor 148 or second switch means responsive to a timing signal provided by a voltage of varying amplitude appearing at the output of bridge rectifier 64, a second PUT 152 gated by the discharging of timing capacitor 118, and finally, resistors 150, 154, and 156, the last two forming a voltage dividing network. A capacitor 158 in the gating circuit of PUT 152 is provided for coupling a gating signal to the PUT, while resistor 160 and capacitor 162 inhibit firing of PUT 152 except when the timing capacitor discharges.

In operation, it is first assumed that the motor 10 is operating at a fixed speed and certain conditions external to the operation of the control circuit demand that the speed of the motor be changed, or decreased. To this end, the pressure transducer 82 will cause wiper arm 86 to move downward with respect to its previous position, thereby transmitting a less positive (or more negative) voltage to the base of transistor 102 causing current flow through said transistor to increase. In turn, current flow through the base circuit of transistor 98 will increase thereby causing current flow through the collector circuit of transistor 98 to increase and a larger voltage to be developed across emitter resistor 107. The increased voltage across resistor 107 will bias transistor 100 so as to decrease current flow therethrough resulting in a smaller voltage being developed across load resistor 101. As noted earlier, it is the level of the voltage across resistor 101 which determines the phase angle of the alternating current at which the capacitor 118 discharges. Therefore, since the phase angle at which the SCR's 24 and 26 are periodically caused to conduct depends upon the phase angle at which capacitor 118 discharges, the voltage across resistor 101 in effect determines the speed of the motor 10.

Considering now the charging circuit for capacitor 118, it can be seen that this capacitor is charged through transistor 116 and resistor 120. Since the time for charging capacitor 118 through the relatively low resistance of transistor 116 is much shorter than through the much larger resistance of resistor 120, the capacitor will charge very quickly to a first or lower charge level through transistor 116 to the voltage level developed across resistor 101. The capacitor 118 will then continue to charge through resistor 120 to a second or critical charge level, though at a much slower rate than when charging through transistor 116. It is when the charge on capacitor 118 reaches the critical charge level that capacitor 118 discharges to generate the gating pulse for the SCR's.

In the present situation under discussion wherein it is assumed, the motor speed is to be decreased, the voltage across resistor 101 will have been decreased by the speed change requirement. Further, since the charge rate of the capacitor through the fast charge path is constant, the capacitor will reach the first or lower charge level at an earlier time in a half cycle of the alternating current powering the motor. Consequently, as the capacitor continues to charge through the resistor 120 at the much slower rate, the critical charge level will be reached at a later time during a given half cycle since it must charge longer than before the speed change requirement arose. When the capacitor 118 finally charges to the critical charge level, PUT 122, which is electrically in parallel with capacitor 118, will be gated into conduction. Consequently, the discharging of capacitor 118 through PUT 122 causes a pulse to be developed across the primary winding 44 of the pulse transformer. A gating pulse is thereby induced into the secondary windings 40 and 42 resulting in the selective gating of SCR's 24 and 26 respectively. Since the gating pulse to SCR's 24 and 26 occurs at a later time in a half cycle than before the decreased speed requirement, it follows that the SCR's 24 and 26 will not be gated into conduction until a later time in the half cycle. For this reason less current is supplied to the motor 10 than before the requirement and the speed of the motor will therefore decrease.

It is clear that an increased speed requirement would cause the voltage appearing on wiper arm 82 to become less negative (or more positive) than before the speed change required. This will effect, as described above, a larger voltage to be developed across resistor 101. Capacitor 118 will thereby charge to a higher first charge level at the faster rate, and hence, a shorter time will be required to charge capacitor 118 to the critical charge level than before the increased speed requirement. The shorter time will cause the gating of SCR 24 or 26 at an earlier time in the half cycle, and consequently, since the SCR will be conducting for a longer period of time than before the increased speed requirement, more current will be supplied to motor 10 causing it to increase speed. Thus, by controlling the time in a half cycle at which the timing capacitor reaches the critical charge level, the firing angle of the SCR's during each half cycle can be determined.

Conduction of PUT 122, through which timing capacitor discharges to develop the gating pulses, is dependent not only upon the difference of potential developed from cathode to anode, determined by the charge level of timing capacitor 118, but it is further dependent upon the difference of potential between the anode 123 and the gate lead 125 of that PUT. The voltage on the gate lead is dependent upon two factors. Firstly, it depends upon the voltage developed across resistor 128, and secondly, it depends upon the voltage generated by the inhibit circuit.

Referring to the first dependency, since resistor 128 is part of a voltage divider network, the voltage developed across resistor 128 will be some constant value less than the DC bus voltage. Thus, eventually capacitor 118 will charge higher than the voltage level across resistor 128 and PUT 122 will be caused to conduct. The inhibit circuit, however, is a secondary factor upon which conduction of PUT 122 depends. In the event that the SCR's 24 and 26 do have a predetermined voltage of sufficient amplitude applied across them by the alternating current source to allow them to conduct if gated, this predetermined voltage will be detected by the primary winding 142 of the transformer 140 paralleling the SCR's and a voltage will be induced into secondary winding 144 of the transformer. Then, through the action of resistor 138 and the diodes 132, 134, 135, and 136 comprising a bridge rectifier, the voltage or signal appearing on the base of transistor 130 will be positive with respect to the emitter, and consequently will not conduct. As a result, the voltage applied to gate lead 125 is determined solely by the voltage developed across resistor 128, and, as outlined above, PUT 122 will become conductive upon the capacitor 118 reaching the critical charge level or voltage. In the event that a sufficiently high voltage is not applied across the SCR's, the absence thereof will, through the transformer 140, the resistor 138, and the bridge circuit 131, cause a negative voltage or signal to be applied to the base of transistor 130 with respect to its emitter and said transistor will become conductive. When transistor 130 is conducting, it effectively applies the high positive DC voltage from bus 119a to gate lead 125 of PUT 122. Thus, even though capacitor 118 reaches the critical charge level, PUT 122 will not conduct.

To effect an accurate timing system it is critical to the circuit operation that timing capacitor 118 be completely discharged at the end of each half cycle. Moreover, it is further critical that capacitor 118 not charge and discharge more than once in any half cycle. Both of these demands are met by the conduction of transistor 146 at a selected time during a half cycle. The period when transistor 146 conducts or does not conduct is dependent immediately upon the operating state of either transistor 148 or PUT 152. If either of these last mentioned devices are conducting, transistor 146 will be conducting; and when transistor 146 is conducting, capacitor 118 will be effectively shorted out by this transistor and as a result unable to charge to the critical charge level.

In following the operation of transistor 146 and its effect upon timing capacitor 118, it will be instructive to examine the operation of the timing circuit at that time in a half cycle of the supply current immediately before the timing capacitor commences to discharge. At that time, the transistors 146 and 148 as well as PUT 152 are cut off. At the moment capacitor 118 discharges through PUT 122, the rapidly decreasing voltage at the anode 123 of PUT 122 is coupled through capacitor 158 to cause a negative going gating pulse to appear on the gate lead of PUT 152. At this instant of time in the cycle, PUT 152 has the proper voltage developed across it to allow it to conduct. The conduction of PUt 152 causes a base current to flow through transistor 146 causing it to conduct and hold capacitor 118 discharged. The proper voltage developed across PUT 152 to permit it to conduct, namely, a positive voltage on the anode with respect to the cathode of PUT 152, results from the following conditions. A positive voltage from bridge rectifier 64 appears on the anode of diode 74 causing it to conduct. This positive voltage, which will be clamped to a level slightly greater (more positive) than the voltage on bus 119a, is applied to the base of transistor 148. Transistor 148 will thereby be in a non-conductive state and the collector of transistor 148 as well as the cathode of PUT 152 will be at the reference bus 119 potential. When the voltage that appears on the output of bridge rectifier 64 decreases below the voltage level of bus 119a, diode 74 will cease to conduct and the voltage on the anode of diode 74 will therefore follow the decreasing voltage. At some voltage level below the bus 119a voltage, the emitter to base junction of transistor 148 will become forward biased and thus start to conduct. At that time, two distinct results follow. Firstly, the current flowing through transistor 148 reinforces the current through resistor 154 and the base of transistor 146, thereby holding transistor 146 in a conducting state; and secondly, since the base of transistor 148 which is electrically the same point as the anode of PUT 152, has become less positive, and further, since the voltage on the cathode of PUT 152 will rise to approximately the positive bus voltage level due to conducting transistor 148, PUT 152 will cut off. As noted, however, transistor 146 will continue to conduct and timing capacitor 118 will thereby be prevented from charging.

Transistor 148 will remain conducting for the duration of the then present half cycle of the AC voltage and will continue to conduct for the first portion of the following half cycle. When the voltage appearing on the output of bridge rectifier 64 during this following half cycle rises to a level positive enough to reverse bias the base to emitter junction of transistor 148, this transistor will cut off. Immediately thereafter transistor 146 will cut off. At that time capacitor 118 will rapidly charge to the first charge level described earlier, and then slowly charge to the higher critical charge level whereupon another half cycle of operation will be initiated.

Thus, by the above-described novel motor control circuit, it is clear that an accurate and reliable means for controlling the speed of a single phase motor is effected. Further, since only a single pulse for gating the SCR's controlling current flow to the motor is generated during each half cycle, the possibility of multiple triggering of the SCR's during any half cycle is negatived. Moreover, additional circuitry of the invention insures that the single gating pulse generated will not be wasted during a half cycle by attempting to gate an SCR that is not in condition to conduct. By this invention, then, it is clear that the possibilities of supplying power to a motor for more than or less than the requisite amount for any half cycle is minimized and erratic speed operation is avoided.

While there is shown and described a specific embodiment of this invention, it will be understood that the invention is not limited to the particular construction shown and described, and it is intended by the appended claims to cover all modifications within the spirit and scope of this invention.

What is claimed is new and desired to be secured by Letters Patent of the United States is:

1. A speed control circuit for a motor to be powered from an alternating current source including controllable bidirectional current conducting means for controlling the application of the current to the motor, said speed control circuit comprising:
   a. a capacitor;
   b. means for charging said capacitor at a first rate to a first charge level, and means for charging said capacitor at a second rate to a predetermined higher charge level;
   c. a programmable unijunction transistor for gating said current conducting means, said transistor being responsive to said predetermined higher charge level on said capacitor to drive said current conducting means from a non-conductive to a conductive state periodically at a selected phase angle of each half cycle of said alternating current; and d. means for inhibiting said capacitor from charging to said predetermined higher charge level more than once during each half cycle of voltage from the alternating current source.

2. A speed control circuit as recited in claim 1 wherein the means for charging said capacitor at a first rate to a first charge level includes means for varying said first charge level.

3. A speed control circuit as recited in claim 1 wherein said means for inhibiting said capacitor from charging to said predetermined level more than once during each half cycle of current comprises a switch means connected across said capacitor.

4. A speed control circuit as recited in claim 1 wherein said means for inhibiting comprises:
   a. a timing signal having a varying amplitude;
   b. a controllable unidirectional current conducting means having conducting and non-conducting states responsive to the discharge of said capacitor to conduct when said capacitor discharges;
   c. a first switch means connected across said capacitor, said switch means having conducting and non-conducting states and conducting in response to the conducting state of said controllable unidirectional current conducting means;
   d. a second switch means having conducting and non-conducting states, said second switch means responsive to the timing signal to conduct when the amplitude of the timing signal achieves a first level, and to become non-conducting when the amplitude of the timing signal achieves a second level;
   e. said first switch means remaining in its conducting state in response to the conducting state of said second switch means after said controllable unidirectional current conducting means becomes non-conducting, said first switch means becoming non-conductive in response to the non-conducting state of said second switch means.

5. A speed control circuit as recited in claim 4 wherein said controllable unidirectional current conducting means is a programmable unijunction transistor.

6. A speed control for a motor to be powered from an alternating current source including controllable bi-directional current conducting means for controlling the application of the current to the motor, and including a circuit for controlling said current conducting means, said circuit comprising:
   a. means for gating said current conducting means;
   b. means for sensing the absence of a predetermined voltage across said current conducting means and developing a first signal in response to the absence of the predetermined voltage to inhibit the gating of said current conducting means, said sensing means further sensing the presence of said predetermined voltage across said current conducting means and developing a second signal in response to the presence of said predetermined voltage to permit the gating of said current conducting means;
   c. a capacitor;
   d. means for charging said capacitor to a predetermined charge level;
   e. means for discharging said capacitor when said predetermined charge level is achieved; and
   f. means for inhibiting said capacitor from charging to said predetermined charge level more than once during each half cycle of voltage from the alternating current source.

7. A speed control circuit as recited in claim 6 including: a timing means for charging said capacitor, said timing means responsive to the voltage of the alternating current source to charge said capacitor once each half cycle of said alternating current.

* * * * *